F. T. BERTRAND.
Cultivator.
No. 205,828.　　　　　Patented July 9, 1878.
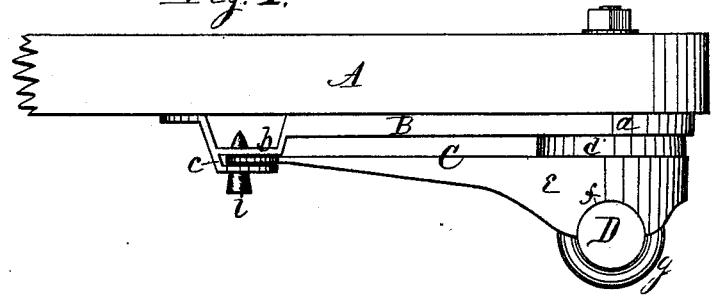
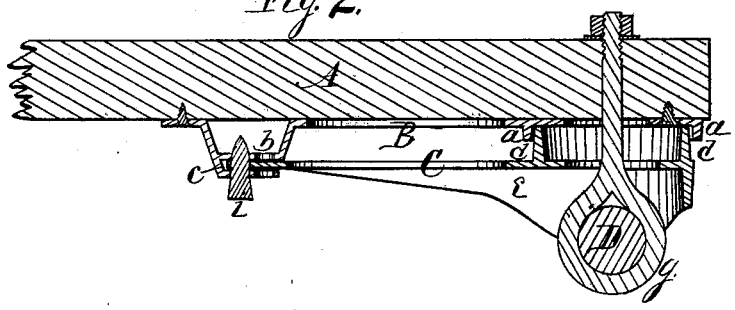
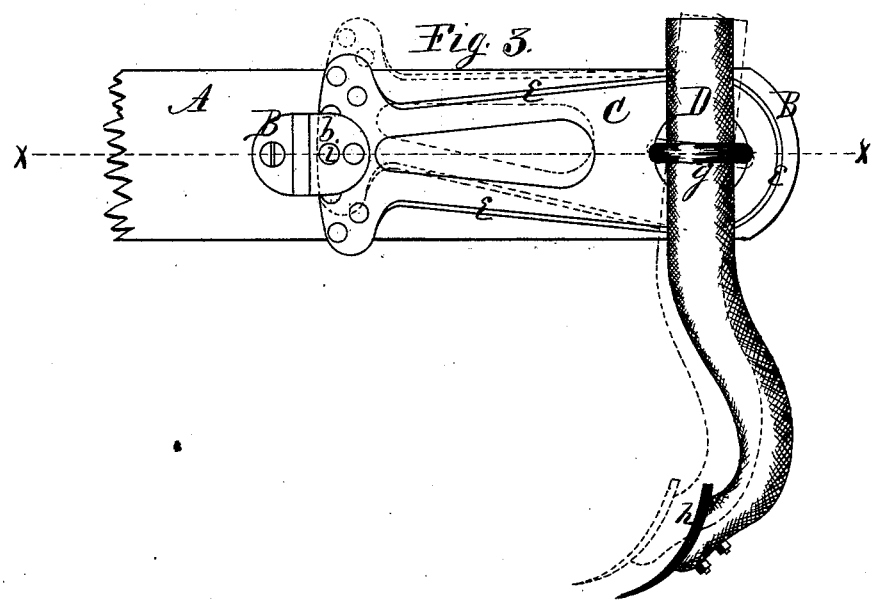

UNITED STATES PATENT OFFICE.

FRANK T. BERTRAND, OF ROCKFORD, ILLINOIS.

IMPROVEMENT IN CULTIVATORS.

Specification forming part of Letters Patent No. 205,828, dated July 9, 1878; application filed May 20, 1878.

*To all whom it may concern:*

Be it known that I, FRANK T. BERTRAND, of the city of Rockford, in the county of Winnebago and State of Illinois, have invented a new and useful Improvement in Cultivators, of which the following is a specification:

This invention has relation to the devices employed in connecting the shovel-standards to the drag-bars of the cultivator.

The object of my invention is to provide a device to secure the shovel-standards to the drag-bar of a cultivator or other similar implement in such a manner as to admit of the vertical adjustment of the standard and the shovel thereto attached, and by means of which the shovel can be turned on its axis to throw the earth to either side, and by which the angle of the shovel relatively with the surface can be changed, to dispense with the brace commonly employed to connect the lower portion of the standard with the forward portion of the drag-bar, to employ the common safety break-pin, and to provide a device made interchangeable and capable of use on either side of either drag-bar.

In the drawings, Figure 1 is a plan view of my improved standard-holder as applied to a drag-bar, of which Fig. 2 is a lengthwise horizontal section on dotted line $x$, and Fig. 3 is a side elevation.

In the figures, A represents the rear portion of a drag-bar, made of suitable material and of proper size. B represents a bed-plate, a convenient form of which is represented in the drawings, formed with an outward-projecting ring, as seen at $a$, forming a circular cup; and its sides are provided with lengthwise ribs projecting from its outer face, employed to give increased strength with little material. Its forward end is formed with an outward projection, as represented at $b$, and is provided with a lengthwise vertical slot, $c$, adapted to receive the clevis-formed end of the brace-plate C. The bed-plate is fixed in position at proper intervals on the vertical sides of the drag-bars by means of sufficient screws or bolts passed through its outer ends. The brace-plate C is provided with a ring, $d$, projecting from the inner face of its rear end, forming a cup adapted to enter the circular cup formed on the outer face of the bed-plate by the projecting ring $a$, which forms a swivel-joint connection of the plates. The outer face of the brace-plate C is provided with an outward-projecting rim, $e$, having its outer edges formed with semicircular grooves, as at $f$, to receive a round shovel-standard. The plates are constructed with openings in the center of the cups, at their rear ends, to admit the shank of the screw-eye, which connects the shovel-standard to the drag-bar. $g$ is an eye-bolt, fitted to receive the shovel-standard loosely. Its screw-threaded shank is passed transversely through the center openings of the cups and through the drag-bar, and its screw-threaded end is provided with a screw-nut, by means of which the shovel-standard is held firmly in position. D represents the shovel-standard, to the lower end of which the shovel $h$ is secured in any proper manner. Its upper end is passed through the eyebolt, and rests in the circular grooves in the outer rim of the brace-plate, and is made vertically-adjustable therein, and capable of being turned on its axis in its bearings to cause the shovel to throw the earth to either side as may be required in use. The forward end of the brace-plate C is of clevis form, fitted to play freely in the vertical slot $c$, and is provided with a series of holes to correspond with similar holes through the plates that form the slot $c$. These holes receive a safety wooden break-pin, $i$, which, when under strain that might otherwise injure the shovel, will be broken and permit the shovel, with the standard to which it is attached, to turn backward and permit the shovel to pass the obstruction without injury. It can then be returned into position and a new pin inserted. By means of the series of holes in the clevis-formed end of the brace-plate and the break-pin, the inclination of the shovel with reference to the surface of the ground can be changed when required. The outward-projecting portion of the forward end of the bed-plate furnishes a free discharge for the inner end of the broken pin.

From the foregoing it will be seen that the cups formed on the rear ends of the bed and brace plates by the rings $a$ and $d$, to enter each other, serve to control the movement of the brace-plate relatively with the bed-plate to be in position to receive a break-pin; and the brace-plate, being removed some distance, serves to bring the strain on the brace more nearly with the standard.

I claim as my invention—

1. The combination, with a bed-plate having a raised bearing on one end for the adjustable attachment of the arm of the standard-holder, and a projecting annular flange on its opposite end, of a standard-holder provided with an annular flange, which fits within the annular flange on the bed-plate, while the forward end of the holder is connected with the bed-plate by a break-pin, substantially as set forth.

2. The combination, with a bed-plate having a raised bearing on one end for the reception of a break-pin, of a standard-holder provided with a series of holes in its forward end, whereby the standard may be adjustably secured to the bed-plate by means of a break-pin, substantially as set forth.

3. The combination, with a bed-plate provided with a raised bearing for the reception of a break-pin, and an annular flange on its opposite end, of a standard-holder provided with a series of holes in its forward end and an annular flange on its rear end, substantially as set forth.

FRANK T. BERTRAND.

Witnesses:
A. O. BEHEL,
JAMES FERGUSON.